(12) United States Patent
Yamamoto

(10) Patent No.: US 7,118,212 B2
(45) Date of Patent: Oct. 10, 2006

(54) IMAGE DISPLAY DEVICE

(75) Inventor: Masao Yamamoto, Tokyo (JP)

(73) Assignee: Scalar Corporation, Tokyo (JP)

( * ) Notice: Subject to any disclaimer, the term of this patent is extended or adjusted under 35 U.S.C. 154(b) by 0 days.

(21) Appl. No.: 10/524,209

(22) PCT Filed: Aug. 12, 2003

(86) PCT No.: PCT/JP03/10229

§ 371 (c)(1),
(2), (4) Date: Feb. 10, 2005

(87) PCT Pub. No.: WO2004/017120

PCT Pub. Date: Feb. 26, 2004

(65) Prior Publication Data

US 2005/0254134 A1 Nov. 17, 2005

(30) Foreign Application Priority Data

Aug. 12, 2002 (JP) .............................. 2002-235141
Mar. 4, 2003 (JP) .............................. 2003-057782
Mar. 4, 2003 (JP) .............................. 2003-057783

(51) Int. Cl.
*G02C 7/02* (2006.01)
(52) U.S. Cl. ...................... 351/159; 351/158; 359/630; 359/633
(58) Field of Classification Search ................ 351/158, 351/159; 359/13–14, 630–633
See application file for complete search history.

(56) References Cited

U.S. PATENT DOCUMENTS 4,806,011 A * 2/1989 Bettinger .................... 351/158
5,162,828 A * 11/1992 Furness et al. .............. 353/122
5,455,640 A * 10/1995 Gertsikov .................... 351/158
5,606,743 A * 2/1997 Vogt et al. ................... 455/347
6,394,601 B1 * 5/2002 Bettinger .................... 351/158
2003/0184868 A1 * 10/2003 Geist .......................... 359/630

FOREIGN PATENT DOCUMENTS

JP          07-209600         8/1995
WO      WO 94/09398     *  4/1994
WO      WO 01/06298 A1    1/2001

OTHER PUBLICATIONS

Copy Of English Language Abstract of JP-A-7-209600.
Copy Of International Search Report dated Oct. 29, 2003, for PCT/JP03/10229.

* cited by examiner

*Primary Examiner*—Jordan M. Schwartz
(74) *Attorney, Agent, or Firm*—Michael Bednarek; Pillsbury Winthrop Shaw Pittman LLP

(57) ABSTRACT

To provide an image display device of the type use while worn on the head without giving a strange impression when used in everyday life.

An image display device 1 includes a main body 10 that can be worn on the head of a user, ad a display unit 20 for displaying a predetermined image in such a manner that the image is blurred or beyond the vision of the user when the user wearing the main body 10 on his or her head looks straight ahead, and that the user gets a clear vision of the image when the user moves his or her eyes away. The display unit 20 includes a pair of display units for the right and left eyes which are provided on or in the main body 10 at a position that cannot be seen from anyone other than the user.

8 Claims, 5 Drawing Sheets

IMAGE DISPLAY DEVICE

TECHNICAL FIELD

The present invention relates to a small image display device that can be used while worn on the head.

BACKGROUND OF THE INVENTION

Head mounted displays (HMDs), which are used while worn on the head to place a video screen in front of each eye of the user, find applications in various fields including the field of virtual reality. Typical HMDs are designed in the shape of a frame of goggles or large glasses that block but outside light and force the user to see only the HMD's pictures. With an HMD used, the user can view images irrespective of the direction he or she faces but then again it gives the user visual isolation from the surrounding environment.

In recent years, small image display devices have been proposed that allow users to view images along with the surrounding environment by means of presenting the images in a certain part of the field of vision. Such image display devices are not designed for image presentation only. Instead, the main purpose of it is to aid the everyday life. Images that are displayed are letters and numeric characters unlike the conventional HMDs.

For example, Japanese patent laid-open document (JP-A-7-209600) proposes an image display device having a liquid crystal display (LCD), a reflecting mirror, an ocular lens and other components contained within a single housing which is attached to a glasses or sunglasses frame. The housing is placed on top of either right or left lens of the glasses over the outside surface of it. An image that is displayed on the LCD is directed to one eye of the user in a diagonal down direction through the reflecting mirror, the ocular lens, and the lens of the glasses.

The image display device disclosed in the aforementioned reference is designed so that it is attached to the glasses, which spoils its appearance. Therefore, the use of an image display device as above in everyday life gives a strong impression of something strange to those around the user.

An object of the present invention is to provide an image display device of the type used while worn on the head without giving a strange impression when used in everyday life.

SUMMARY OF THE INVENTION

An image display device that solves the aforementioned problem comprises a main body that can be worn on the head of a user, and display means for displaying a predetermined image in such a manner that said image is blurred or beyond the vision of said user when said user wearing said main body on his or her head looks straight ahead, and that said user gets a clear vision of said image when said user moves his or her straight-looking eyes away, said display means being provided on or in said main body at a position that cannot be seen from anyone other than said user.

Such an image display device has the display means that cannot be seen from anyone other than the user. Therefore, no one is aware of the display means and accordingly no one feels a strange impression when said image display device is used in everyday life.

For example, said main body may be provided in the shape of a glasses frame. At least a part of said frame is positioned in such a manner that said part is not very clearly visible for said user when said user wearing said main body on his or her head looks straight ahead. Said display means is provided on or in said part of said frame. The image display device does not look any different from conventional glasses, giving no strange impression in everyday life.

Alternatively, said main body may comprise an elongated front unit that is placed in front of the eyes of said user along the direction parallel to a line connecting the right and left eyes when said main body is worn on the head of said user, and a fixing unit for use in mounting said front unit on the head of said user. In this case, said display means is provided on or in said front unit. Such a main body may be hard to fit into our everyday life as compared with a main body having the shape of a glasses frame. However, it has a simple structure and is designed well. The front unit in this case may be, for example, in the shape of a rod or a thin, narrow plate. The front unit may have a diameter of about 10 mm to 30 mm when shaped as a rod. The front unit may have a width of about 10 mm to 50 mm when shaped as a thin, narrow plate. The diameter of the rod-shaped front unit and the width of the plate-shaped front unit are not required to have a same dimension along the length thereof.

The front unit may be deformed more or less in the up and down directions with respect to the face of the user. Alternatively, it may be deformed more or less in the right and left directions with respect to the face of the user.

The display means may have various configurations. As an example, said display means has a light source, liquid crystal display means that uses said light source for the backlight thereof and an optical system to guide an image produced by said liquid crystal display means to the outside of said main body, all of which are contained within said main body.

The image display device may be downsized by using said main body for receiving an image signal by wire or wireless to display an image from outside and by using said display means for displaying an image from said image signal received by said means. An example of the image signal includes a video signal and an RGB signal.

Said display means may be a pair of display means that are provided on or in said main body in one to one correspondence with the right and left eyes of said user. Since these display means provide images at a position or positions close to the eyes of the user when worn, the display means corresponding to the respective eyes allow easy production of sophisticated images such as three-dimensional images.

Said display means may be configured in such a manner that said user gets a clear vision of said images to be displayed only when said user wearing said main body on his or her head moves his or her straight-looking eyes down. This configuration allows the user to watch his or her step while viewing said images displayed by the display means. This makes mobile use of said image display device easy.

Another image display device of the present invention may comprise a main body in the shape of a glasses frame and display means that is provided on or in said main body to present an image to a user, said display means having a light source, liquid crystal display means that uses said light source for the backlight thereof, a reflecting mirror to guide an image produced by said liquid crystal display means to the outside of said main body and an ocular lens for directing said image to said user, all of which are contained within said main body, said ocular lens being not very clearly visible for said user when said user wearing said main body looks straight ahead, which becomes clearly visible only when said user moves his or her straight-looking eyes away, said ocular lens being provided at a position that cannot be seen from anyone other than said user.

Another image display device of the present invention may comprise a main body having an elongated front unit and a fixing unit for use in mounting said front unit on the head of said user, and display means that is provided on or in said main body to present an image to said user, said display means having a light source, liquid crystal display means that uses said light source for the backlight thereof, a reflecting mirror to guide an image produced by said liquid crystal display means to the outside of said main body and an ocular lens for directing said image to said user, all of which are contained within said main body, said front unit being placed in front of the eyes of said user along the direction parallel to a line connecting the right and left eyes when said main body is worn on the head of said user, said ocular lens being not very clearly visible for said user when said user wearing said main body looks straight ahead, which becomes clearly visible only when said user moves his or her straight-looking eyes away, said ocular lens being provided at a position that cannot be seen from anyone other than said user.

BRIEF DESCRIPTION OF THE DRAWINGS

FIG. 3A is a view showing the state that a user wearing the image display device looks straight ahead, whereas

BEST MODE FOR CARRYING OUT THE INVENTION

Figure 1:
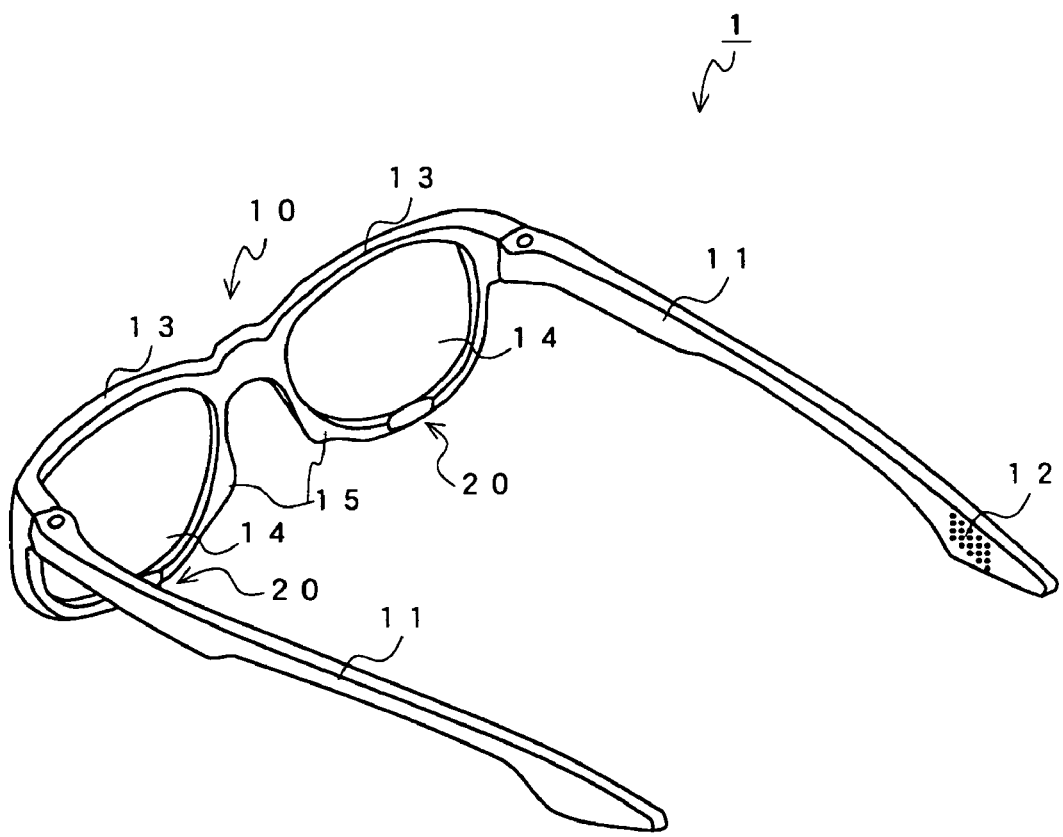
FIG. 1 is a view showing the whole of an image display device according to an embodiment.

An embodiment of the present invention is described in detail below with reference to the drawing.

FIG. 1 is an outline view of an image display device 1 of the present invention.

The image display device 1 comprises a main body 10 in the shape of a glasses frame and display units 20 for displaying an image. The image display device 1 is a device that receives an image signal, such as a video signal or an RGB signal, by wire or wireless from an image processor which is not shown, to produce images from the image signal on the display units 20.

The main body 10 is designed in such a manner that the user can wear the image display device 1 on his or her head. The main body 10 comprises temples 11 which fit over the user's ears to keep the image display device 1 on when the user wears it on his or her head, and a frame 13 on which or in which the display units 20 are provided. The frame 13 can be fitted around lenses 14 as in normal glasses or sunglasses. Nose pads 15 are attached to the frame 13 in order for the image display device 1 to rest stably while worn by the user.

The main body 10 has an audio output device 12, such as a speaker or an earphone, through which sound comes out for the user. The audio output device 12 is integrally provided in the temple 11. Since the audio output device 12 rests close to the user's ear(s) when the user wears the image display device 1, the output sound which comes out through the audio output device 12 is not required to be so loud.

While not illustrated in the drawing, the main body 10 has a cable or an antenna to receive image signals from the image processor by wire or wireless. The received image signal is supplied to the display units 20. Simultaneous reception of the sound which comes out through the audio output device 12 and the image signal from the image processor achieves easier synchronization between the image and sound.

Figure 2:
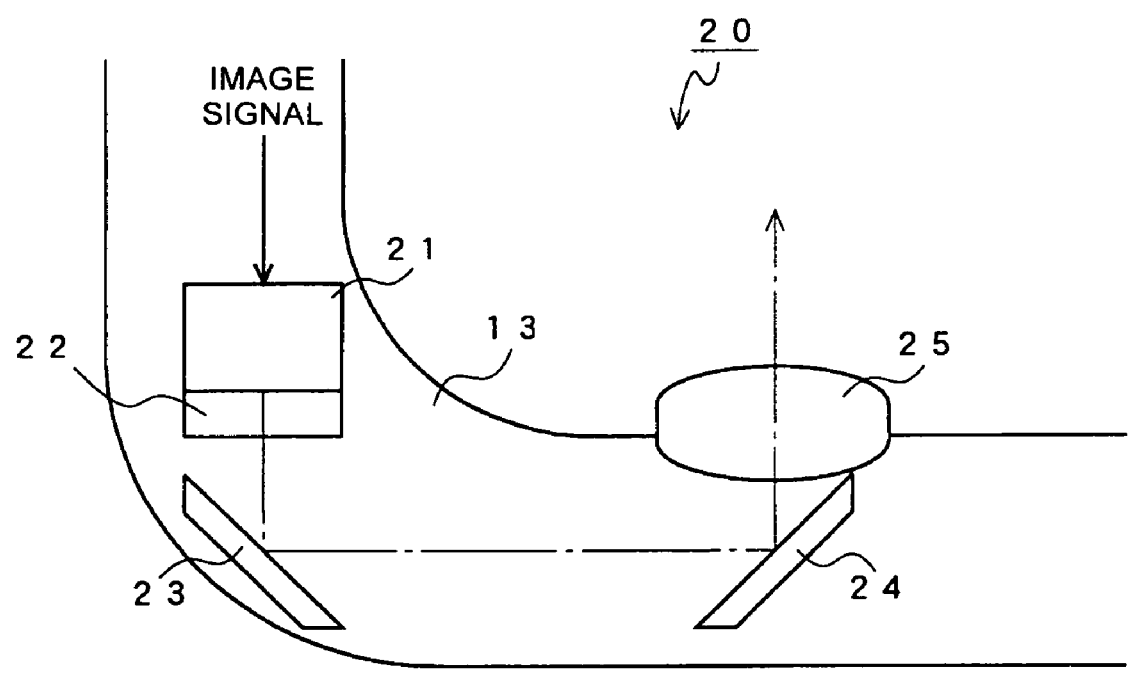
FIG. 2 is a view showing details of a display unit.

The display units 20 are provided on or in the frame 13 of the main body 10. Each display unit 20 is designed as shown in FIG. 2. The display unit 20 comprises a light source 21, a liquid crystal display 22 and reflecting mirrors 23 and 24, all of which are contained within the frame 13. An ocular lens 25 is also provided on or in the frame 13. The liquid crystal display 22 uses the light source 21 for the backlight thereof. It produces images from the image signal received by the main body 10. The image produced by the light source 21 and the liquid crystal display 22 is guided to the outside of the frame 13 through the optical system consisting of the reflecting mirrors 23 and 24 and the ocular lens 25.

Figure 3A:
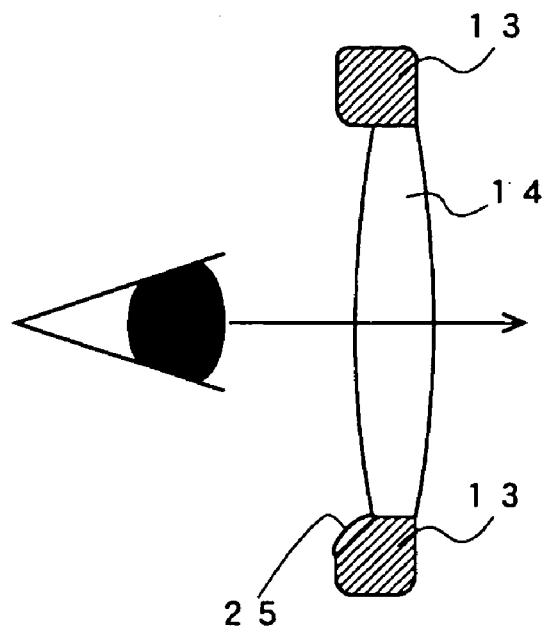
Figure 3B:
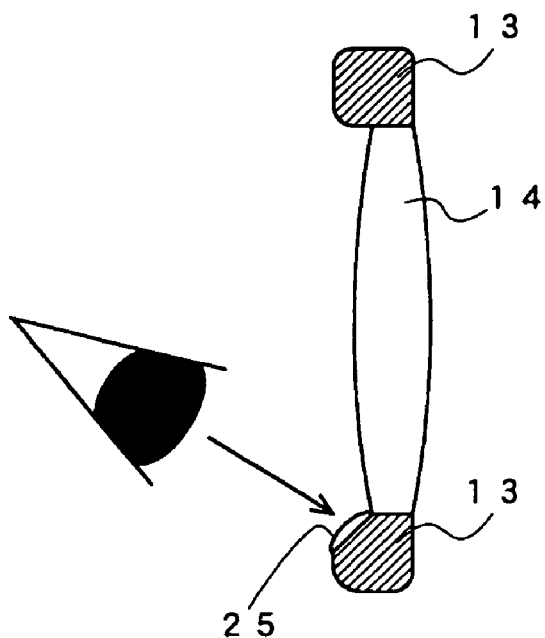
FIG. 3B is a view showing the state that the user looks at the display unit.

The ocular lenses 25 are provided on or in the frame 13. When the user wearing the image display device 1 looks straight ahead, the images from the ocular lenses 25 are blurred or beyond the vision of the user (FIG. 3A). In the case of this embodiment, the user should move his or her eyes down to look at lower portions of the frame 13 in order to view the images from the ocular lenses 25 (FIG. 3B).

The position of each ocular lens 25 is not limited to the aforementioned one. They may be provided at upper or side portions of the frame 13. In any cases, the images from the ocular lenses 25 are invisible from the user when the user looks straight ahead. It can be visible only when the user moves his or her eyes to the direction of the ocular lenses 25.

The ocular lenses 25 are provided on or in the frame 13 on the side facing to the user in such a manner that only this particular user can see them while he or she is wearing the image display device 1. Thus, anyone other than the user cannot see the ocular lenses 25.

As apparent from the above, all the components of the display units 20 except for the ocular lenses 25 are housed within the frame 13. The ocular lenses 25 are provided at a hidden position that is invisible from anyone other than the user. Thus, no one other than the user will be aware of the display units 20. The image display device 1 gives no strange impression to others when used even in everyday life.

The image display device 1 as described above can be used as in the case of ordinary glasses. More specifically, the images displayed on the display units 20 do not catch the user's eyes while the user wearing the image display device 1 looks straight ahead. Therefore, the same usability as ordinary glasses or sunglasses is available. The user becomes aware of the images only when he or she moves his or her eyes to the ocular lenses 25.

<<First Modification>>

Figure 4:
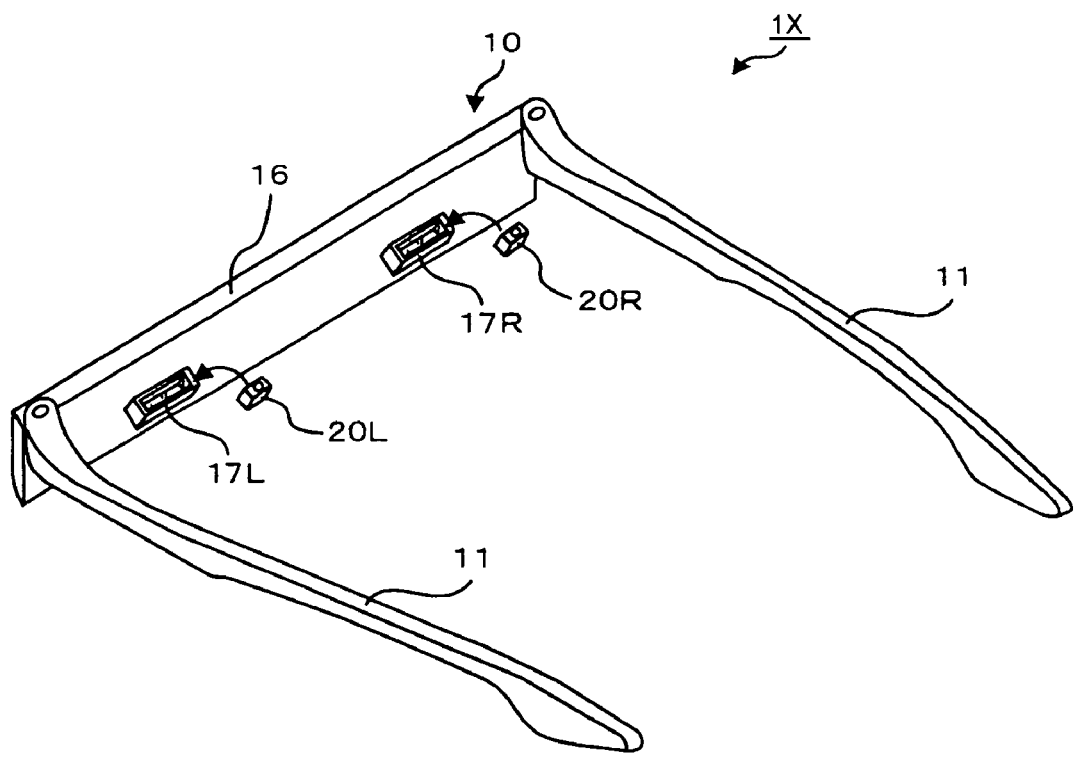
FIG. 4 is a perspective view of an image display device according to a first modification.
Figure 5:
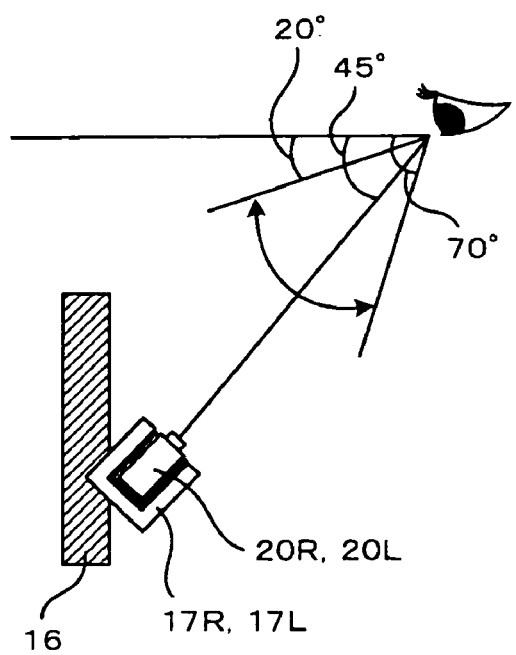
FIG. 5 is a side view schematically showing the state that the user is wearing the image display device in FIG. 4 on his or her head.

The image display device 1 may by modified as shown in FIGS. 4 and 5.

FIG. 4 is a perspective view of an image display device 1X according to a first modification. FIG. 5 is a side view showing how the image display device 1X is used. Similar reference numerals in FIGS. 4 and 5 to those used in FIGS. 1 to 3 represent similar components and parts to those shown in FIGS. 1 to 3. Repeated description will be omitted.

Details of the image display device 1X shown in FIGS. 4 and 5 are essentially the same as those of the image display device 1 described in the aforementioned embodiment.

The difference of the image display device 1X from the image display device 1 lies in their structure: the main body 10 of the image display device 1 is designed like a glasses frame having the temples 11 and the frame 13 whereas the main body 10 of the image display device 1X has temples 11 and a front unit 16.

The front unit 16 of the image display device 1X has an elongated shape, more specifically, a shape of a thin, narrow plate.

The front unit 16 is provided with display units 20 (20R, 20L) similar to those of the image display device 1. The display units 20 are placed on the backside (on the side fronting onto the user's face when the main body 10 is mounted on the user's head) of the front unit 16 in the shape of a thin, narrow plate. In addition, while not necessarily being required, the display units 20 of this embodiment are attached to the front unit 16 in such a manner that they are beyond the beholder's vision when the user wearing the main body 10 on his or her head is seen from an anterior view. The width of the front unit 16 is, but not limited to, 15 millimeters.

Each of the display units 20R and 20L in this modification 1 has a generally rectangular parallelepiped shape with one surface opened to the air. They can be attached to the backside of the front unit 16 by means of fitting them into respective hollow sockets 17 (sockets 17R and 17L for the right and left eyes, respectively) formed on or in the backside of the front unit 16.

FIG. 5 is a side view schematically showing the state that the user is wearing the image display device 1X on his or her head. As apparent from FIG. 5, the display units 20 of the image display device 1X are attached to the front unit 16 at an angle that allows the user to see the images produced by them when the user moves his or her eyes down. The front unit 16 is located slightly below the eyes of the user when the user wears the main body unit 10 on his or her head so that the user can see the images produced by the display units 20 when the user moves his or her eyes down. Details of the display units 20 are the same as that of the image display device 1.

In this embodiment, the right eye can catch the image displayed on the display unit 20R for the right eye whereas the left eye can catch the image displayed on the display unit 20L for the left eye when the user looks down at an angle of, but not limited to, 45 degrees with his or her head facing the front (see FIG. 5). This angle is preferably at least 20 degrees in order to give a forward field of vision of the user during the time when the user does not look at the images displayed on the display units 20R and 20L. The aforementioned angle is preferably not larger than 70 degrees because an unduly large angle prevents the user's easy seeing of the images displayed on the display units 20R and 20L. The sockets 17R and 17L are fixed to the front unit 16 at such an angle that the user can look at the display units 20R and 20L over the aforementioned range of angles.

<<Second Modification>>

Figure 6:
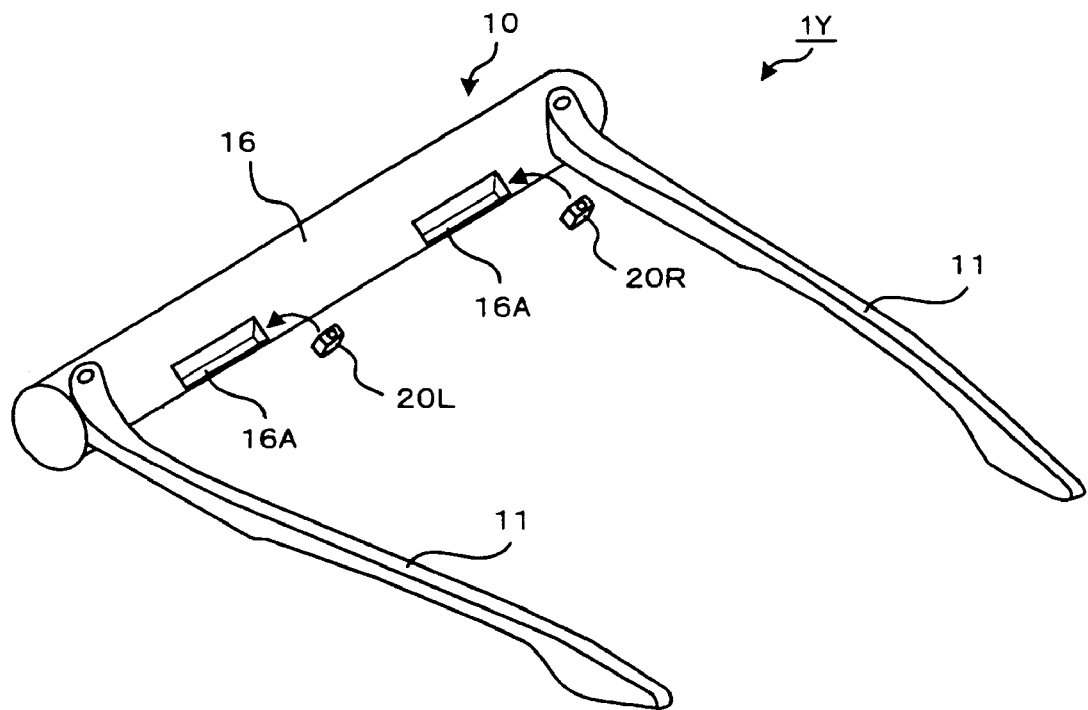
FIG. 6 is a perspective view of an image display device according to a second modification.
Figure 7:
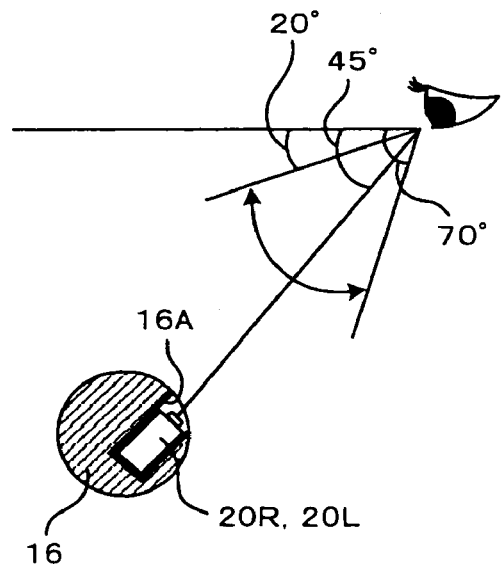
FIG. 7 is a side view schematically showing the state that the user is wearing the image display device in FIG. 6 on his or her head.

Another modification (second modification) of the image display device 1 is shown in FIGS. 6 and 7. Similar reference numerals in FIGS. 6 and 7 to those used in FIGS. 4 and 5 represent similar components and parts to those shown in FIGS. 4 and 5. Repeated description will be omitted.

FIG. 6 is a perspective view of an image display device 1Y according to a second modification. FIG. 7 is a side view schematically showing the state that the user is wearing the image display device 1Y on his or her head.

Most of the details of the image display device 1Y shown in FIG. 6 are the same as those of the image display device 1X.

The difference between them lies in the shape of their front unit 16. The front unit 16 of the image display device 1X according to the first modification has a shape of a thin, narrow plate whereas the front unit 16 of the image display device 1Y according to the second modification has a shape of a rod with a generally circular cross section in this embodiment. The diameter of the front unit 16 is, but not limited to, 13 millimeters.

In the image display device 1Y, the front unit 16 is provided with the display units 20 (20R, 20L). The display units 20 are placed on the backside (on the side fronting onto the user's face when the main body 10 is mounted on the user's head) of the front unit 16, as in the case of the image display device 1X. In addition, while not necessarily being required, the display units 20 of this embodiment are attached to the front unit 16 in such a manner that they are beyond the beholder's vision when the user wearing the main body 10 on his or her head is seen from an anterior view.

In this embodiment, depressions 16A are formed in the backside of the rod-shaped front unit 16 at positions corresponding to the right and left eyes of the user (see FIG. 6). The display units 20 are fitted into the respective depressions, which makes the beholder difficult to see the display units 20 when the user wearing the main body 10 on his or her head is seen from an anterior view.

As apparent from FIG. 7, the display units 20 of the image display device 1Y are attached to the front unit 16 at an angle that allows the user to see the images produced by them when the user moves his or her eyes down. The front unit 16 is located slightly below the eyes of the user when the user wears the main body unit 10 on his or her head so that the user can see the images produced by the display units 20 when the user moves his or her eyes down.

In this embodiment, the right eye can catch the image displayed on the display unit 20R for the right eye whereas the left eye can catch the image displayed on the display unit 20L for the left eye when the user looks down at an angle of, but not limited to, 45 degrees with his or her head facing the front (see FIG. 7). This angle is preferably at least 20 degrees in order to give a forward field of vision of the user during the time when the user does not look at the images displayed on the display units 20R and 20L. The aforementioned angle is preferably not larger than 70 degrees because an unduly large angle prevents the user Is easy seeing of the images displayed on the display units 20R and 20L. The depressions 16A are formed in the front unit 16 at such an angle that the user can look at the display units 20R and 20L over the aforementioned range of angles.

The invention claimed is:

1. An image display device comprising a main body in the shape of a glasses frame and display means that is provided in said main body to present an image to a user;
   said display means having:
   a light source, liquid crystal display means that use said light source for the backlight thereof, a reflecting mirror to guide an image produced by said liquid crystal display means to the outside of said main body and an ocular lens for directing said image to said user, all of which are contained within said main body;

said ocular lens being not very clearly visible for said user when said user wearing said main body looks straight ahead, which becomes clearly visible only when said user moves his or her straight-looking eyes away, said ocular leans being provided at a position that cannot be seen from anyone other than said user.

2. The image display device as claimed in claim 1, wherein said main body comprises means for receiving an image signal by wire or wireless to display an image from outside, said display means being adapted to display an image from said image signal received by said means.

3. The image display device as claimed in claim 1, wherein said display means is a pair of display means that are provided in said main body in one to one correspondence with the right and left eyes of said user.

4. The image display device as claimed in claim 1, wherein said display means is configured in such a manner that said user gets a clear vision of said images to be displayed only when said user wearing said main body on his or her head moves his or her straight-looking eyes down.

5. An image display device comprising a main body having an elongated front unit and a fixing unit for use in mounting said front unit on the head of said user, and display means that is provided in said main body to present an image to said user;

said display means having:

a light source, liquid crystal display means that use said light source for the backlight thereof, a reflecting mirror to guide an image produced by said liquid crystal display means to the outside of said main body and an ocular lens for directing said image to said user, all of which are contained within said main body, said front unit being placed in front of the eyes of said user along the direction parallel to a line connecting the right and left eyes when said main body is worn on the head of said user;

said ocular lens being not very clearly visible for said user when said user wearing said main body looks straight ahead, which becomes clearly visible only when said user moves his or her straight-looking eyes away, said ocular lens being provided at a position that cannot be seen from anyone other than said user.

6. The image display device as claimed in claim 5, wherein said main body comprises means for receiving an image signal by wire or wireless to display an image from outside, said display means being adapted to display an image from said image signal received by said means.

7. The image display device as claimed in claim 5, wherein said display means is a pair of display means that are provided in said main body in one to one correspondence with the right and left eyes of said user.

8. The image display device as claimed in claim 5, wherein said display means is configured in such a manner that said user gets a clear vision of said images to be displayed only when said user wearing said main body on his or her head moves his or her straight-looking eyes down.

* * * * *